US008456983B2

(12) United States Patent
Luo

(10) Patent No.: US 8,456,983 B2
(45) Date of Patent: Jun. 4, 2013

(54) METHOD AND SYSTEM FOR ARRANGING LINK RESOURCE FRAGMENTS

(75) Inventor: Zhenjiang Luo, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/257,918

(22) PCT Filed: Sep. 23, 2009

(86) PCT No.: PCT/CN2009/074148
§ 371 (c)(1),
(2), (4) Date: Nov. 23, 2011

(87) PCT Pub. No.: WO2010/148596
PCT Pub. Date: Dec. 29, 2010

(65) Prior Publication Data
US 2012/0082451 A1    Apr. 5, 2012

(30) Foreign Application Priority Data

Jun. 23, 2009  (CN) .......................... 2009 1 0108116

(51) Int. Cl.
*H04J 1/16*    (2006.01)
*H04J 3/16*    (2006.01)
*H04B 10/00*   (2006.01)

(52) U.S. Cl.
USPC ................................ 370/225; 370/466; 398/4

(58) Field of Classification Search
None
See application file for complete search history.

(56) References Cited

U.S. PATENT DOCUMENTS

| 6,058,119 A * | 5/2000 | Engbersen et al. ........... 370/466 |
| 7,340,163 B2 * | 3/2008 | Hardee ............................. 398/4 |
| 2003/0145246 A1 * | 7/2003 | Suemura ........................... 714/2 |

FOREIGN PATENT DOCUMENTS

| CN | 101146368 A | 3/2008 |
| CN | 101321115 A | 12/2008 |
| WO | 2007134479 A1 | 11/2007 |

OTHER PUBLICATIONS

International Search Report for PCT/CN2009/074148 dated Mar. 15, 2010.

* cited by examiner

*Primary Examiner* — Melanie Jagannathan
(74) *Attorney, Agent, or Firm* — Ling Wu; Stephen Yang; Ling and Yang Intellectual Property

(57) ABSTRACT

The present invention relates to the field of optical communication and provides a method and system for arranging link resource fragments. The method comprises: configuring cascade services in a link in advance; generating a preset arrangement method according to an initial channel number of occupied channel(s) in the link and a cascade number of service born in the channel(s) (S210); a local end node that initiates a link resource arrangement notifying an opposite end node to arrange link resource fragments (S220); the local end node and the opposite end node reconfiguring a cross connection according to the preset arrangement method (S230). The method and system of the present invention can re-arrange the channel resources within one link, and integrate the scattered channel resource fragments into complete and available resources with a broader bandwidth, thus achieving the maximum utilization of the link bandwidth resources.

11 Claims, 7 Drawing Sheets

METHOD AND SYSTEM FOR ARRANGING LINK RESOURCE FRAGMENTS

TECHNICAL FIELD

The present invention relates to the field of optical communication, and more particularly, to a method and system for arranging link resource fragments in an automatic switched optical network (ASON).

BACKGROUND OF THE RELATED ART

ASON uses a link management protocol (LMP) to manage transport link resources. The LMP functions are: control channel management, link attribute association, link connectivity validation, link fault management and resource discovery, and so on; these functions, however, do not relate to how to allocate and release channel resources in the link. Some link resource allocation strategies can be applied when designing the ASON system, for example, a low channel number preferential allocation strategy can be used to orderly allocate the channel resources.

In addition, the transport link has a set of standard rate levels in an optical network. A basic signal level is a synchronous transmission module STM-1, and the corresponding rate is 155 Mbit/s. High level digital signal series, such as 622 Mbit/s (STM-4) and 2.5 Gbit/s (STM-16), etc., can be formed by byte interleave synchronous multiplexing the low rate level information module (such as STM-1), where the number of multiplexing is a multiple of 4, for example: STM-4=4×STM-1 and STM-16=4×STM-4, and this method for dividing the rate levels is called cascade method.

However, when allocating and releasing the transport link resources in the cascade method, it results in generation of resource fragments inevitably. A special example will be used to illustrate this case in the following. In a certain case, resources of all 16 channels in one STM-16 link are applied, and then resources of 12 channels in all, i.e., channel 1-3, 5-7, 9-11 and 13-15, in the 16 channel are released. The occupation of the channel resources in the link is shown as FIG. 1; although the number of available idle resources is 12 channels, it cannot satisfy to allocate a relatively smaller STM-4 resource, thus link resource fragments are generated. The existence of the link resources fragments results in a serious consequence of wasting bandwidths, thus it needs to rearrange the channel resources in one link and integrate the scattered channel resource fragments into a complete available resource with a broader bandwidth.

CONTENT OF THE INVENTION

The purpose of the present invention is to provide a method and system for arranging link resource fragments, so as to rearrange the channel resources in one link, and integrate the scattered channel resource fragments into a complete available resource with a broader bandwidth, thus maximally utilizing link bandwidth resources. The purpose of the present invention is implemented with the following technical scheme.

A method for arranging link resource fragments, configuring cascade services in a link in advance, comprises:

generating a preset arrangement method according to an initial channel number of occupied channel(s) in the link and a preconfigured cascade number of service born in the channel(s);

a local end node that initiates a link resource arrangement notifying an opposite end node of the local end node to arrange link resource fragments; and the local end node and the opposite end node reconfiguring a cross connection according to the preset arrangement method;

so that the arrangement of the link resource fragments is implemented by configuring the cascade services in the link in advance.

The step of the local end node and the opposite end node reconfiguring the cross connection according to the preset arrangement method comprises:

if the link bearing the cascade services has a protection link, symmetrically switching a cascade service signal born in the occupied channels in the link to a protection channel in the protection link, and then switching the service signal in the protection channel to an adjusted target channel according to the preset arrangement method;

if there is no protection link, switching a cascade service signal born in the occupied channel to an adjusted target channel directly according to the preset arrangement method.

The step of the local end node that initiates the link resource arrangement notifying the opposite end node of the local end node to arrange the link resource fragments comprises:

the local end node sending a request link resource fragment arrangement message including a link identification, all channel numbers that require to be arranged, all arranged channel numbers and all service identifications to the opposite end node, and the opposite end node suspending receiving service signals in to-be-arranged channels according to the request link resource fragment arrangement message.

The step of generating the preset arrangement method according to the initial channel number of the channels occupied in the link and the number of preconfigured cascade services born in the channel comprises:

generating a first dyadic array list by taking the initial channel number of the occupied channel(s) and the cascade number of service born in the channel(s) as array elements;

generating a second dyadic array list by the first dyadic array list according to a preset adjustment rule;

rearranging the first dyadic array list according to the second dyadic array list;

taking channel(s) corresponding to the array element in the second dyadic array list as target channel(s) of the occupied channel(s) corresponding to the array element in the rearranged first dyadic array list.

Further, the step of generating the first dyadic array list by taking the initial channel number of the occupied channel(s) and the cascade number of service born in the channel(s) as the array elements comprises:

checking the cascade number of service born in the occupied channel(s) according to the order from small channel serial number to large channel serial number, and recording the dyadic arrays corresponding to all the occupied channels, wherein, the value of the first element in the dyadic array is the initial channel serial number of the occupied channel(s) and the value of the second element is the cascade number of service born in the occupied channel(s);

arranging the dyadic arrays according to the non-increasing order of the cascade number to generate the first dyadic array list.

Further, the steps of generating the second dyadic array list by the first dyadic array list according to the preset adjustment rule and rearranging the first dyadic array list according to the second dyadic array list comprises:

taking all the second elements in the first dyadic array list as all the second elements in the second dyadic array list;

arranging the first elements in the second dyadic array list from the minimum target channel serial number, and the value of the first element arranged in the back is the value of the first element arranged in the adjacent front plus the value of the second element corresponding to the first element in the adjacent front;

adjusting the dyadic arrays in the first dyadic array list one that are the same as those in the second dyadic array list two to the corresponding positions in the second dyadic array list two.

Further, the step of taking the channel(s) corresponding to the array element in the second dyadic array list as the target channel(s) of the occupied channel(s) corresponding to the array element in the rearranged first dyadic array list comprises:

if the first dyadic array list has the same dyadic array in the second dyadic array list, not reconfiguring the cross connection; if the first dyadic array list has no same dyadic array in the second dyadic array list, determining the channel corresponding to the value of the first element in the second dyadic array list as the target channel to reconfigure the cross connection.

A system for arranging link resource fragments comprises nodes and a link between the nodes and reconfigured with cascade services, and the system further comprises:

a preset arrangement method generation unit, configured to make a local end node that initiates a link resource arrangement to generate a preset arrangement method according to an initial channel number of occupied channel(s) in the link and a preconfigured cascade number of service born in the channel(s);

a resource fragment arrangement information synchronization unit, configured to make the local end node that initiates the link resource arrangement to notify an opposite end node of the local end node to arrange link resource fragments, meanwhile, make the local end node to send the preset arrangement method to the opposite end node; and a cross connection configuration unit, configured to make the local end node and the opposite end node to reconfigure a cross connection according to the preset arrangement method.

The preset arrangement method generation unit further comprises:

a first dyadic array list generation unit, configured to generate a first dyadic array list by taking the initial channel number of the occupied channel(s) and the cascade number of service born in the occupied channel(s) as array elements;

a second dyadic array list generation unit, configured to adjust the first dyadic array list to a second dyadic array list according to a preset adjustment rule;

a first dyadic array list adjustment unit, configured to rearrange the first dyadic array list according to the second dyadic array list;

a target channel generation unit, configured to take channel(s) corresponding to the array element in the second dyadic array list as target channel(s) of the occupied channel(s) corresponding to the array element in the rearranged first dyadic array list.

The target channel generation unit further comprises:

a dyadic array comparison unit, configured to compare the first dyadic array list and the second dyadic array list to judge whether the first dyadic array list has the same dyadic arrays as the dyadic arrays in the second dyadic array list;

a target channel determination unit, configured to determine that the cross connection is not reconfigured according to a comparison result of the dyadic array comparison unit or determine the channel corresponding to the value of the first element in the second dyadic array list as the target channel to reconfigure the cross connection.

With the method and system of the present invention, a link resource fragment arrangement function supporting the cascade services can be added in the ASON system, and this function can be activated as desired to rearrange the link channel resources, so that the scattered channel resource fragments are integrated into a complete available resource with a broader bandwidth, thus achieving the maximum utilization of the bandwidth resource.

PREFERRED EMBODIMENTS OF THE PRESENT INVENTION

The method and system for arranging link resource fragments in the ASON provided in the present invention will be illustrated in further detail through the following description in combination with the accompanying drawings and embodiments.

Figure 1:
FIG. 1 is a schematic diagram of an example in the prior art.
Figure 2:
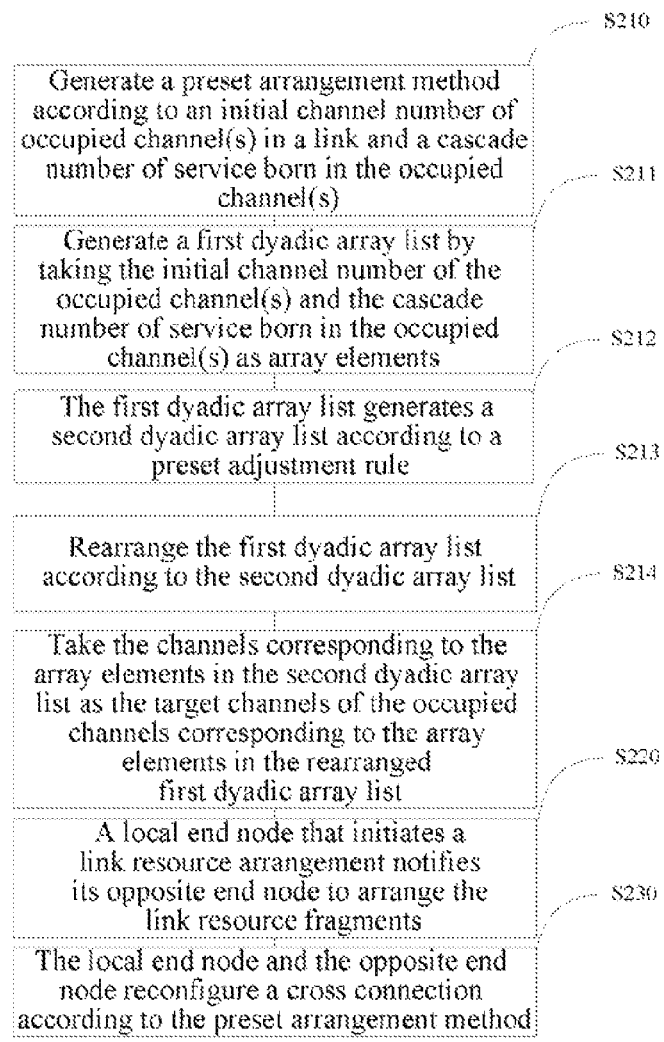
FIG. 2 is a schematic diagram of a flow chart of a method for arranging link resource fragments in accordance with a first embodiment of the present invention.

FIG. 2 is a schematic diagram of a flow chart of a method for arranging link resource fragments in accordance with the first embodiment of the present invention, in which an initial condition is that a STM-N link has been configured and the $x_1, x_2, \ldots, x_m$ (where $0<x_1<x_2< \ldots <x_m<N+1$) channel resources in the link are already used. The steps of arranging the link resource fragments are as follows:

S210, generate a preset arrangement method according to an initial channel serial numbers of occupied channel(s) in a link and a cascade number of service born in the occupied channel(s);

S211, generate a first dyadic array list by taking the initial channel serial number of the occupied channel(s) and the cascade number of service born in the occupied channel(s) as array elements;

first, the cascade number of service born in the occupied channel(s) is checked according to the order from small channel serial number to large channel serial number, and the dyadic arrays corresponding to all the occupied channels are recorded; the value of the first element in the dyadic array is the initial channel serial number of the occupied channel(s), the value of the second element is the cascade number (where, the cascade number is taken by STM-1 as 1) of service born in the occupied channel(s), and the values of the first element and the second element denote as the dyadic array $(x_k, c_k)$; and then according to the cascade number non-increasing order, the dyadic arrays are arranged to generate the first dyadic array list $(y_1, c_1), (y_2, c_2) \ldots (y_r, c_r)$ (where $c_1 \geq c_2 \geq \ldots c_r$), wherein $y_1, y_2, \ldots y_r$ represent the channel serial numbers after the dyadic arrays are ordered. A stable or unstable ordering algorithm or other algorithms can be applied to implement the above arrangement in specific examples, which will not affect the implementation of the present invention;

S212, the first dyadic array list generates a second dyadic array list $(z_1, c_1), (z_2, c_2) \ldots (z_r, c_r)$ according to a preset adjustment rule (take $z_1=1$ for example, then $z_2=z_1+c_1 \ldots Z_r=z_{r-1}+c_{r-1}$);

the step of the first dyadic array list generating the second dyadic array list according to the preset adjustment rule specifically comprises: first, taking all the second elements in the first dyadic array list as all the second elements in the second dyadic array list; and then arranging the first elements in the second dyadic array list from the minimum target channel serial number $z_1$, where the value of the first element arranged in the back is the value of the first element arranged in the adjacent front plus the value of the second element corresponding to the first element arranged in the adjacent front;

S213, rearrange the first dyadic array list according to the second dyadic array list;

the dyadic arrays in the first dyadic array list one that are the same as those in the second dyadic array list two adjust into the corresponding positions in the second dyadic array list two;

S214, take the channels corresponding to the array elements in the second dyadic array list as the target channels of the occupied channels corresponding to the array elements in the rearranged first dyadic array list;

if the first dyadic array list has the same dyadic arrays as those in the second dyadic array list, cross connection is not reconfigured, that is, the services in the $y_k$ to $y_k+c_k-1$ channel resources are not switched and are kept their status before the arrangement unchanged; and if the first dyadic array list has no same dyadic array as that in the second dyadic array list, determine the channel corresponding to the value of the first element in the second dyadic array list as the target channel to reconfigure the cross connection, that is, switch the services in the original $y_k$ to $y_k+c_k-1$ channel resources to the $z_k$ to $z_k+c_k-1$ channel resources.

S220, a local end node that initiates a link resource arrangement notifies its opposite end node to arrange the link resource fragments;

the local end node sends a request link resource fragment arrangement message including a link identification, all channel numbers that requires to be arranged, all arranged channel numbers and all service identifications to the opposite end node, and the opposite end node suspends receiving service signals in the to-be-arranged channels according to the request.

Step 230, the local end node and the opposite end node reconfigure the cross connection according to the preset arrangement method;

if the link bearing the cascade services has a protection link, the cascade service signals born in the occupied channels in the link are symmetrically switched to protection channels in the protection link, and then the service signals in the protection channels switch to the adjusted target channels according to the preset arrangement method;

if there is no protection link, the cascade service signals born in the occupied channels are switched to the adjusted target channels directly according to the preset arrangement method.

Figure 3A:
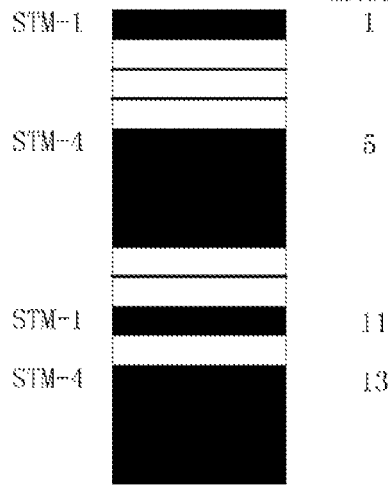
FIG. 3a is a schematic diagram of a initial status of link resources of a method for arranging link resource fragments in accordance with a second embodiment of the present invention.

FIG. 3a is a schematic diagram of an initial status of link resources of a method for arranging link resource fragments in accordance with the second embodiment of the present invention. In a transport link of STM-16, STM-1 resource is allocated on the $1^{th}$ channel, STM-4 resource is allocated on the $5^{th}$ channel, STM-1 resource is allocated on the $11^{th}$ channel, and STM-1 resource is allocated on the $13^{th}$ channel; and the link has six channel resources left. However, due to a phenomenon of resource fragments, there is no way to allocate one more STM-4 resource, and it needs to arrange the link resource fragments.

Figure 3B:
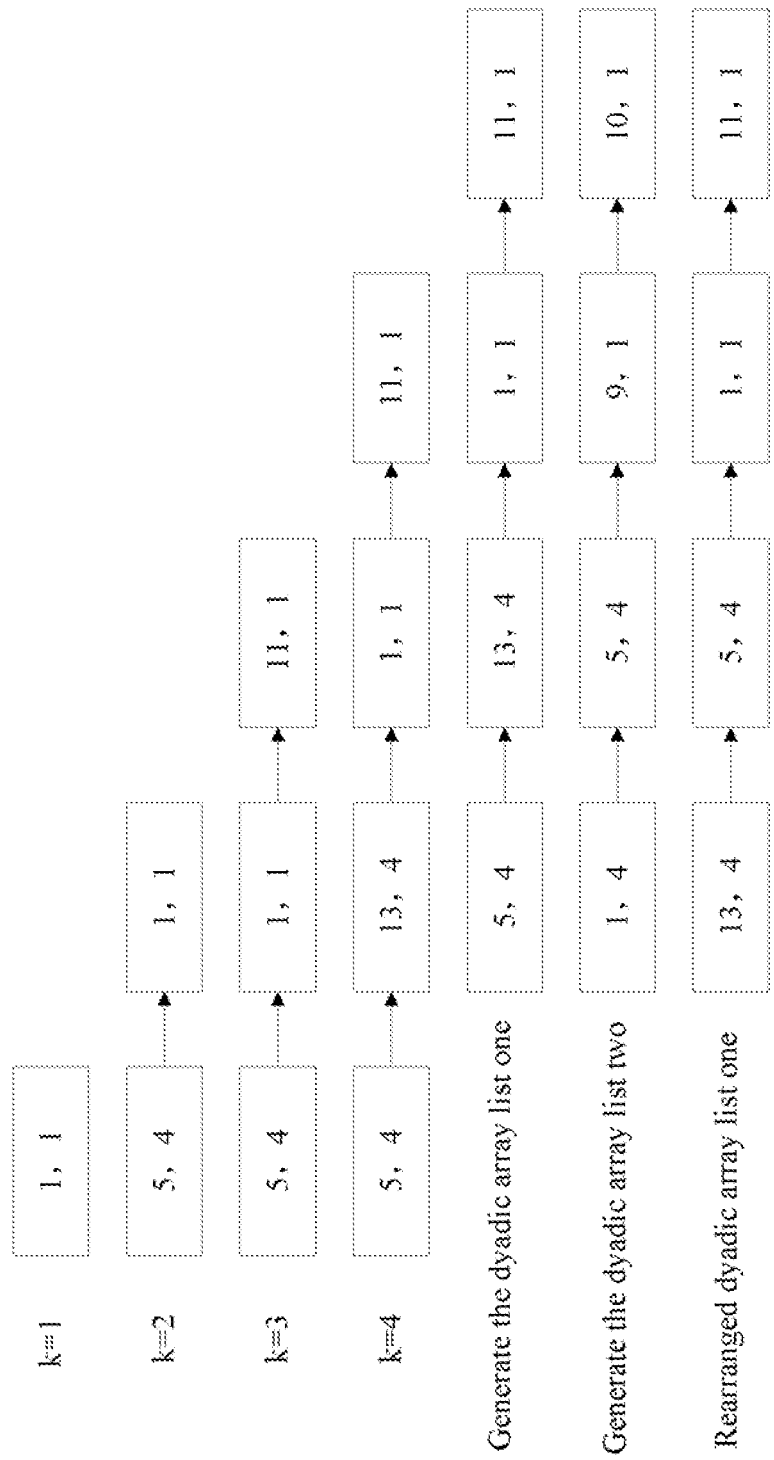
FIG. 3b is a schematic diagram of a process of generating an ordered dyadic array list of a method for arranging link resource fragments in accordance with the second embodiment of the present invention.

FIG. 3b is a schematic diagram of a process of generating an ordered dyadic array list of a method for arranging resource fragments in accordance with the second embodiment of the present invention.

k=1, check the allocated $1^{st}$ channel resource, the rate level is STM-1, and the dyadic array (1, 1) is generated and hung in a header of an empty link list, k=k+1;

k=2, check the allocated $5^{th}$ channel resource, the rate level is STM-4, the dyadic array (5, 4) is generated, inserted into the link list and ordered, k=k+4;

k=6, check the allocated $11^{th}$ channel resource, the rate level is STM-1, the dyadic array (11, 1) is generated, inserted into the link list and ordered, k=k+1; and k=7, check the allocated $13^{th}$ channel resource, the rate level is STM-4, the dyadic array (13, 4) is generated, inserted into the link and ordered, k=k+4.

After checking all the used channels, acquire the dyadic array list one in which the second array element is ordered from large to small: (5, 4), (13, 4), (1, 1), and (11, 1), and according to the preset adjustment rule generate the dyadic array list two: (1, 4), (5, 4), (9, 1) and (10, 1);

according to the dyadic array list two, adjust the dyadic array list one as: (13, 4), (5, 4), (1, 1) and (11, 1).

Figure 3C:
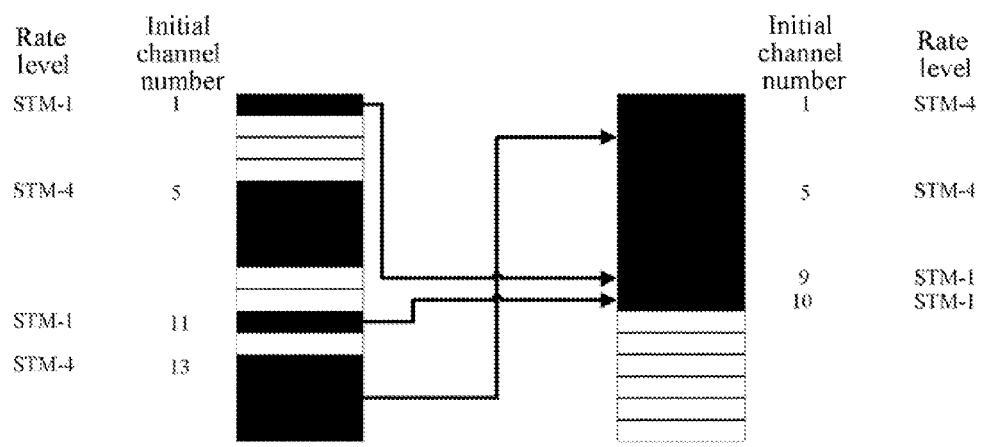
FIG. 3C is a schematic diagram of a process of reconfiguring a cross connection of a method for arranging link resource fragments in accordance with the second embodiment of the present invention.

FIG. 3c is a schematic diagram of a process of reconfiguring a cross connection of a method for arranging resource fragments in accordance with the second embodiment of the present invention. A protection link is on the left and now bears already the practical service signals, and an arranged link resource final status is on the right; and it should be noted that the local end node that initiates the link resource arrangement notifies its opposite end node to arrange the link resource fragments. The two ends perform the following specific arrangement respectively:

k=1, take the first dyadic array (13, 4) in the generated dyadic array list one, and switch the initial STM-4 service signal of the $13^{th}$ channel in the protection link to the STM-4 channel resource at the initial position of the $k^{th}$ (k=1) channel in the local link, k=k+1;

k=2, take the second dyadic array (5, 4) in the generated dyadic array list one, and since the same dyadic array (5, 4) is found in the generated dyadic array list, do not switch the initial STM-4 service signal of the $5^{th}$ channel in the local link and keep it unchangable, k=k+1;

k=3, take the third dyadic array (1, 1) in the generated dyadic array list one, and switch the initial STM-1 service signal of the $1^{st}$ channel in the protection link to the $k^{th}$ (k=9) channel in the local link, k=k+1;

k=4, take the fourth dyadic array (11, 1) in the generated dyadic array list one, and switch the initial STM-1 service signal of the $11^{th}$ channel in the protection link to the $k^{th}$ (k=10) channel in the local link, k=k+1.

k=5, all the dyadic arrays are processed, and link resource fragment arrangement is completed; at the time, the available resources left in the link are still six channels, however, one more STM-4 cascade resource can be allocated.

It can be seen that, with the method provided in the present invention, the scattered channel resource fragments can be integrated into a complete available resource with a broader bandwidth so as to achieve the maximum utilization of the bandwidth resource.

Figure 4A:
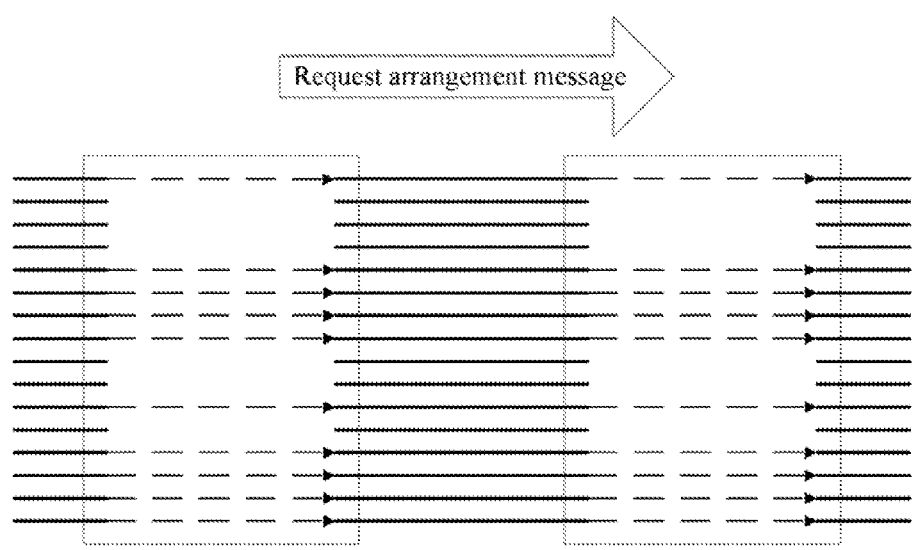
FIGS. 4a to 4e are schematic diagrams of a process of service switching of a method for arranging link resource fragments in accordance with a third embodiment of the present invention.
Figure 4B:
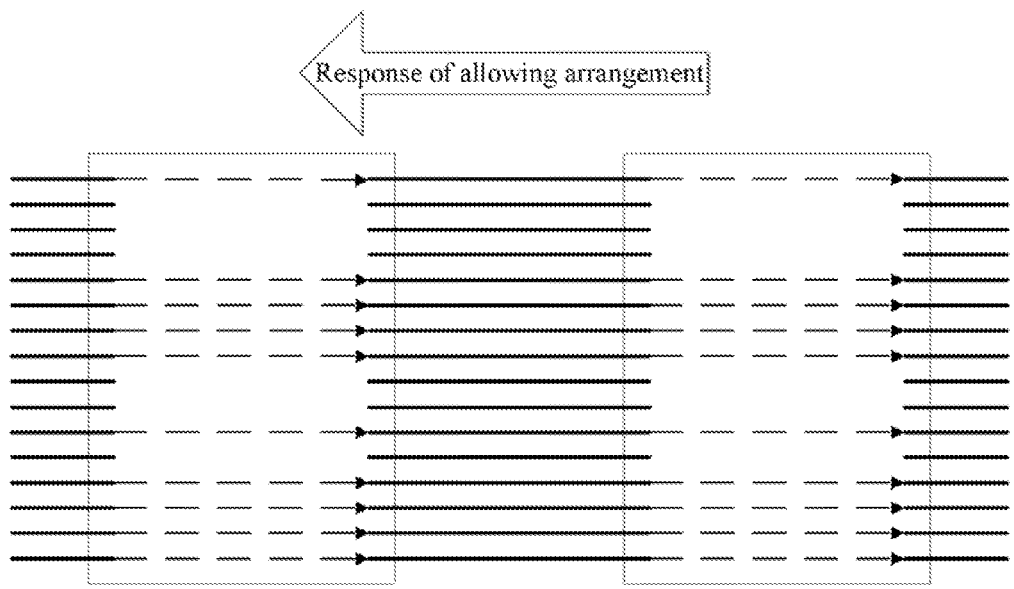
Figure 4C:
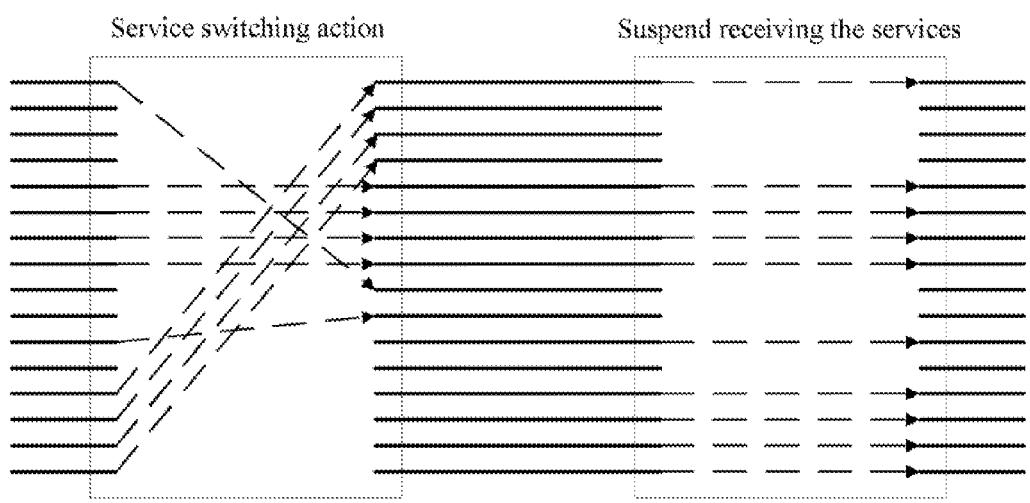
Figure 4D:
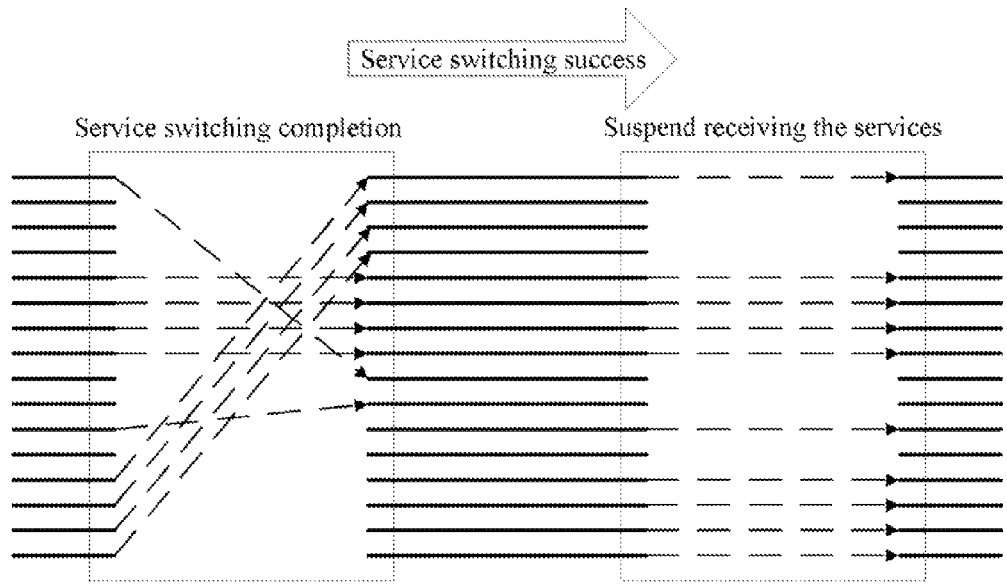
Figure 4E:
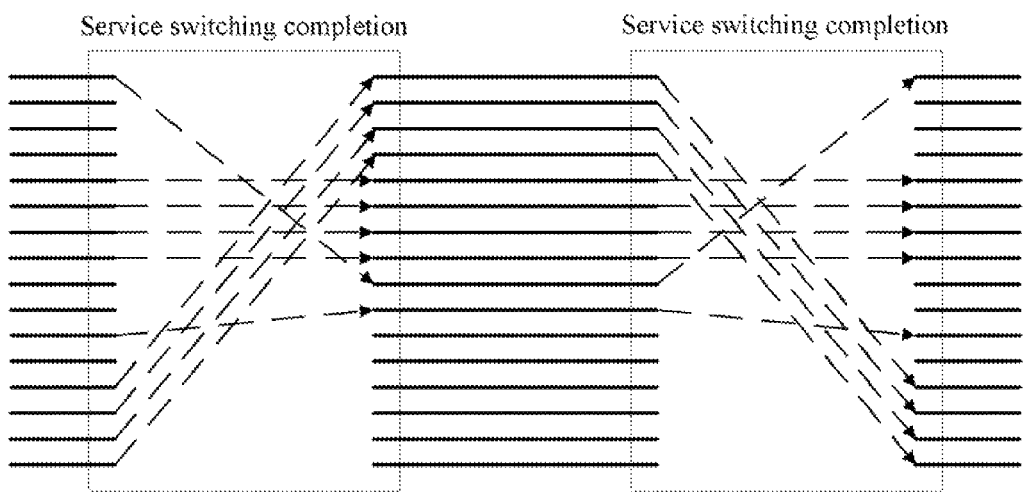

FIG. 4a to FIG. 4e is a schematic diagram of service switching of a method for arranging link resource fragments in accordance with the third embodiment of the present invention. The left box is the local end node and is a service signal sender, and the right box is the opposite end node and is a service signal receiver, solid lines with equal length and both sides aligned indicate each of channels in the same link, and virtual lines with arrows indicate the cross connection. The service signal switching has the following steps:

1. as shown in FIG. 4a, the local end node sends a request link resource fragment arrangement message to the opposite end node, wherein, the request message comprises a link identification, all channel numbers that requires to be arranged, all arranged channel numbers and all service identifications;
2. as shown in FIG. 4b, the opposite end node judges to arrange right now, sends a response message indicating that the arrangement is allowed to the local end node, and suspends receiving the service signals from the to-be-arranged channels;
3. as shown in FIG. 4c, after the local end node receives a response indicting that the request is allowed, the local end node reconfigures the cross connections for all to-be-arranged channels according to the arrangement method;
4. as shown in FIG. 4d, after the local end node performs service switching, the local end node sends a service switching successful message to the opposite end node;
5. as shown in FIG. 4e, after the opposite end node receives the service switching successful message from the local end node, the opposite end node reconfigures the cross connection according to information in the request link resource fragment arrangement message, thus fulfilling the service switching and also the link resource fragment arrangement.

Figure 5:
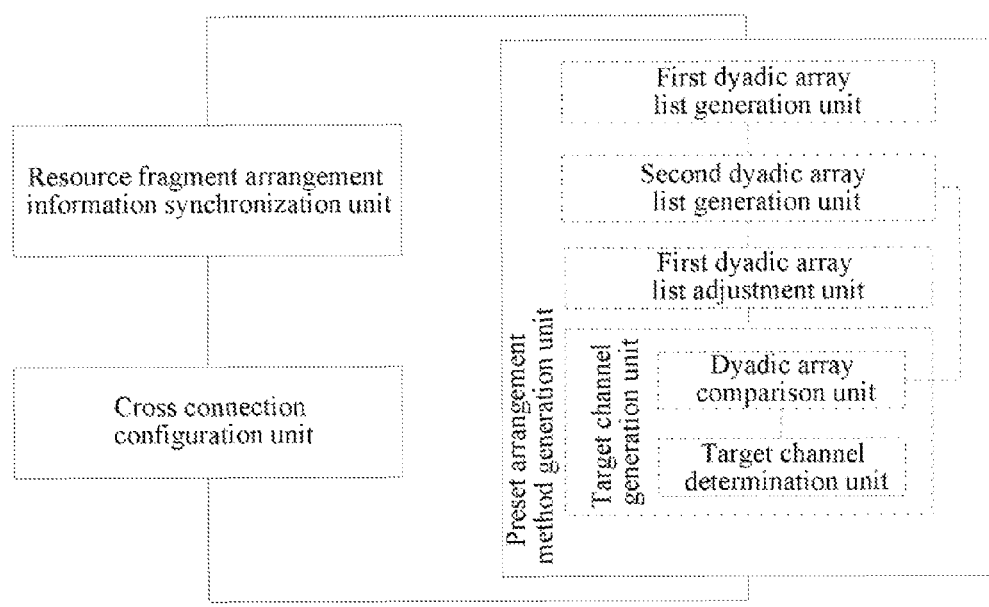
FIG. 5 is a schematic diagram of a structure connection of a system for arranging link resource fragments in accordance with a fourth embodiment of the present invention.

FIG. 5 is a schematic diagram of a structure connection of a system for arranging link resource fragments in accordance with the fourth embodiment of the present invention. The system for arranging the link resource fragments comprises nodes, and a link preconfigured with cascade services and between the nodes, and the system further comprises:

a preset arrangement method generation unit, which connects with a resource fragment arrangement information synchronization unit and a cross connection configuration unit and is used to generate a preset arrangement method by a local end node that initiates a link resource arrangement according to an initial channel number of occupied channel(s) in the link and a cascade number of service born in the occupied channel(s);

the resource fragment arrangement information synchronization unit, which connects with the preset arrangement method generation unit and is used to notify its opposite end node by the local end node that initiates the link resource arrangement to arrange the link resource fragments, meanwhile, to send the preset arrangement method to the opposite end node; and the cross connection configuration unit, which connects with the preset arrangement method generation unit and is used to reconfigure a cross connection by the local end node and the opposite end node according to the preset arrangement method.

Further, the local end node sends a request link resource fragment arrangement request including a link identification, all channel numbers that requires to be arranged, all arranged channel numbers and all service identifications to the opposite end node, and the opposite end node suspends receiving service signals in to-be-arranged channels according to the request.

Further, if the link bearing the cascade services has a protection link, the cascade service signals born in the occupied channels in the link are symmetrically switched to the protection channels in the protection link, and then the service signals in the protection channels are switched to the adjusted target channels according to the preset arrangement method; and if there is no protection link, the cascade service signals born in the occupied channels are switched to the adjusted target channel directly according to the preset arrangement method.

The preset arrangement method generation unit further comprises:

a first dyadic array list generation unit, which is used to generate a first dyadic array list by taking the initial channel number of the occupied channel(s) and the cascade number of service born in the occupied channel(s) as array elements;

specifically, check the cascade number of service born in the occupied channel(s) according to the order from the small channel serial number to the large channel serial number, record the dyadic arrays corresponding to all occupied channels, where, the value of the first element in the dyadic array is the initial channel number of the occupied channel(s), and the value of the second element is the cascade number of service born in the occupied channel(s); and arrange the dyadic arrays to generate the first dyadic array list according to the order from the large cascade number to the small cascade number;

a second dyadic array list generation unit, which connects with the first dyadic array list generation unit and is used to adjust the first dyadic array list to the second dyadic array list according to a preset adjustment rule;

specifically, take all the second elements in the first dyadic array list as all the second elements in the second dyadic array list; arrange the first elements in the second dyadic array list from the minimum target channel serial number, and the value of the first element arranged in the back is the value of the first element arranged in the adjacent front plus the value of the second element corresponding to the first element arranged in the adjacent front;

a first dyadic array list adjustment unit, which connects with the first dyadic array list generation unit and is used to rearrange the first dyadic array list according to the second dyadic array list;

specifically, the dyadic arrays in the first dyadic array list one that are the same as those in the second dyadic array list two are adjusted to the corresponding positions in the second dyadic array list two.

A target channel generation unit is used to take the channels corresponding to the array elements in the second dyadic array list as the target channels of the occupied channels corresponding to the array elements in the rearranged first dyadic array list.

The target channel generation unit also comprises:

a dyadic array comparison unit, which is used to compare the first dyadic array list with the second dyadic array list to judge whether the first dyadic array list has the same dyadic arrays as those in the second dyadic array list;

a target channel determination unit, which is configured to determine that the cross connection is not reconfigured according to a comparison result by the dyadic array comparison unit or determine a channel corresponding to the value of the first element in the second dyadic array list as a target channel;

specifically, if the first dyadic array list has the same dyadic arrays as those in the second dyadic array list, do not reconfigure the cross connection; if the first dyadic array list does not have the same dyadic arrays as those in the second dyadic array list, determine the channel corresponding to the value of the first element in the second dyadic array list as the target channel.

To sum up, the present invention implements the link resource fragment arrangement function in the ASON system. The present invention might have a variety of other embodiments. For those skilled in the art, a variety of modifications and variations can be made according to the present invention, without departing from the spirit and essence of the present invention, and all these types of modifications and variations should comprise in the scope of the appending claims of the present invention.

INDUSTRIAL APPLICABILITY

Compared with the prior art, with the method and system of the present invention, a link resource fragment arrangement function supporting the cascade services can be added in the ASON system, and this function can be activated as desired to rearrange the link channel resources, so that the scattered channel resource fragments are integrated into a complete available resource with a broader bandwidth, thus achieving the maximum utilization of the bandwidth resource.

What is claimed is:

1. A method for arranging link resource fragments, wherein, cascade services are configured in a link in advance and the method comprises steps of:
   generating a preset arrangement method according to an initial channel number of occupied channel(s) in the link and a preconfigured cascade number of service born in the channel(s);
   a local end node that initiates a link resource arrangement notifying an opposite end node of the local end node to arrange link resource fragments; and the local end node and the opposite end node reconfiguring a cross connection according to the preset arrangement method so that scattered channel resource fragments are integrated into a complete available resource with a broader bandwidth by arranging the link resource fragments.

2. The method of claim 1, wherein, the step of the local end node and the opposite end node reconfiguring the cross connection according to the preset arrangement method comprises:
   if the link bearing the cascade services has a protection link, symmetrically switching a cascade service signal born in the occupied channel in the link bearing the cascade services to a protection channel in the protection link, and then switching the service signal in the protection channel to an adjusted target channel according to the preset arrangement method;
   if the link bearing the cascade services has no protection link, switching a cascade service signal born in the occupied channel to an adjusted target channel directly according to the preset arrangement method.

3. The method of claim 2, wherein, the step of the local end node that initiates the link resource arrangement notifying the opposite end node of the local end node to arrange the link resource fragments comprises:
   the local end node sending a request link resource fragment arrangement message including a link identification, all channel numbers that require to be arranged, all arranged channel numbers and all service identifications to the opposite end node, and the opposite end node suspending receiving service signals in to-be-arranged channels according to the request link resource fragment arrangement message.

4. The method of claim 3, wherein, the step of generating the preset arrangement method according to the initial channel number of the occupied channel(s) in the link and the preconfigured cascade number of service born in the channel(s) comprises:
   generating a first dyadic array list by taking the initial channel number of the occupied channel(s) and the cascade number of service born in the channel(s) as array elements;
   generating a second dyadic array list by the first dyadic array list according to a preset adjustment rule;
   rearranging the first dyadic array list according to the generated second dyadic array list;
   taking channel(s) corresponding to the array element in the second dyadic array list as target channel(s) of the occupied channel(s) corresponding to the array element in the rearranged first dyadic array list.

5. The method of claim 4, wherein, the step of generating the first dyadic array list by taking the initial channel number of the occupied channel(s) and the cascade number of service born in the channel(s) as the array elements comprises:
   checking the cascade number of service born in the occupied channel(s) according to the order from small channel serial number to large channel serial number, and recording the dyadic arrays corresponding to all the occupied channels, wherein, the value of the first element in the dyadic array is the initial channel serial number of the occupied channel(s) and the value of the second element is the cascade number of service born in the occupied channel(s);
   arranging the dyadic arrays according to the non-increasing order of the cascade number to generate the first dyadic array list.

6. The method of claim 4, wherein, the steps of generating the second dyadic array list by the first dyadic array list according to the preset adjustment rule and rearranging the first dyadic array list according to the generated second dyadic array list comprise:
   taking all the second elements in the first dyadic array list as all the second elements in the second dyadic array list;
   arranging the first elements in the second dyadic array list from the minimum target channel serial number, and the value of the first element arranged in the back is the value of the first element arranged in the adjacent front plus the value of the second element corresponding to the first element in the adjacent front;
   adjusting the dyadic arrays in the first dyadic array list one that are the same as the dyadic arrays in the second dyadic array list two to the corresponding positions in the second dyadic array list two.

7. The method of claim 4, wherein, the step of taking the channel(s) corresponding to the array element in the second dyadic array list as the target channel(s) of the occupied channel(s) corresponding to the array element in the rearranged first dyadic array list comprises:
   if the first dyadic array list has the same dyadic array in the second dyadic array list, not reconfiguring the cross connection; if the first dyadic array list has no same dyadic array in the second dyadic array list, determining the channel corresponding to the value of the first element in the second dyadic array list as the target channel to reconfigure the cross connection.

8. A system for arranging link resource fragments, comprising nodes and a link between the nodes and preconfigured with cascade services, and further comprising:
- a preset arrangement method generation unit, configured to make a local end node that initiates a link resource arrangement to generate a preset arrangement method according to an initial channel number of occupied channel(s) in the link and a preconfigured cascade number of service born in the channel(s);
- a resource fragment arrangement information synchronization unit, configured to make the local end node that initiates the link resource arrangement to notify an opposite end node of the local end node to arrange link resource fragments, meanwhile, make the local end node that initiates the link resource arrangement to send the preset arrangement method to the opposite end node; and
- a cross connection configuration unit, configured to make the local end node and the opposite end node to reconfigure a cross connection according to the preset arrangement method;

so that scattered channel resource fragments are integrated into a complete available resource with a broader bandwidth by arranging the link resource fragments.

9. The system of claim 8, wherein, the preset arrangement method generation unit further comprises:
- a first dyadic array list generation unit, configured to generate a first dyadic array list by taking the initial channel number of the occupied channel(s) and the cascade number of service born in the occupied channel(s) as array elements;
- a second dyadic array list generation unit, configured to adjust the first dyadic array list to a second dyadic array list according to a preset adjustment rule;
- a first dyadic array list adjustment unit, configured to rearrange the first dyadic array list according to the second dyadic array list; and
- a target channel generation unit, configured to take channel(s) corresponding to the array element in the second dyadic array list as target channel(s) of the occupied channel(s) corresponding to the array element in the rearranged first dyadic array list.

10. The system of claim 8, wherein, said target channel generation unit further comprises:
- a dyadic array comparison unit, configured to compare the first dyadic array list and the second dyadic array list to judge whether the first dyadic array list has the same dyadic arrays as the dyadic arrays in the second dyadic array list; and
- a target channel determination unit, configured to determine that the cross connection is not reconfigured according to a comparison result of the dyadic array comparison unit or determine the channel corresponding to the value of the first element in the second dyadic array list as the target channel to reconfigure the cross connection.

11. The system of claim 9, wherein, said target channel generation unit further comprises:
- a dyadic array comparison unit, configured to compare the first dyadic array list and the second dyadic array list to judge whether the first dyadic array list has the same dyadic arrays as the dyadic arrays in the second dyadic array list; and
- a target channel determination unit, configured to determine that the cross connection is not reconfigured according to a comparison result of the dyadic array comparison unit or determine the channel corresponding to the value of the first element in the second dyadic array list as the target channel to reconfigure the cross connection.

* * * * *